Figure 1:
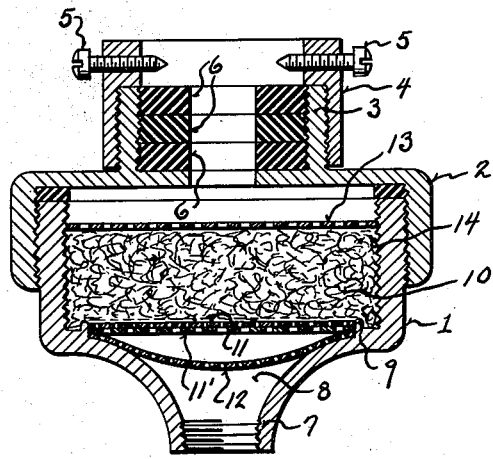

Dec. 25, 1951     J. F. AUBERSCHEK     2,580,066
FAUCET FILTER
Filed Aug. 26, 1948

INVENTOR
JOSEPH F. AUBERSCHEK

ATTORNEYS

Patented Dec. 25, 1951

2,580,066

UNITED STATES PATENT OFFICE 2,580,066

FAUCET FILTER

Joseph F. Auberschek, Milwaukee, Wis.

Application August 26, 1948, Serial No. 46,201

1 Claim. (Cl. 210—87)

My invention refers to domestic faucet filters wherein the same may be conveniently attached to a water faucet spout provided with either a threaded or smooth end, the said filter including an internally threaded casing for the reception of a fibre filter material such as wood pulp, or the like.

A further object of my invention is to provide a faucet filter of the same type, wherein the discharge mouth is internally threaded for the reception of a nozzle extending into the filter material and provided with longitudinally disposed fine strainer slits, through which the filtered water is delivered to the nozzle, it being understood that the said filter material, when packed into the casing, engages the internal thread thereof, whereby it can be readily removed by twisting for the purpose of renewing said filter material.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Figure 2:
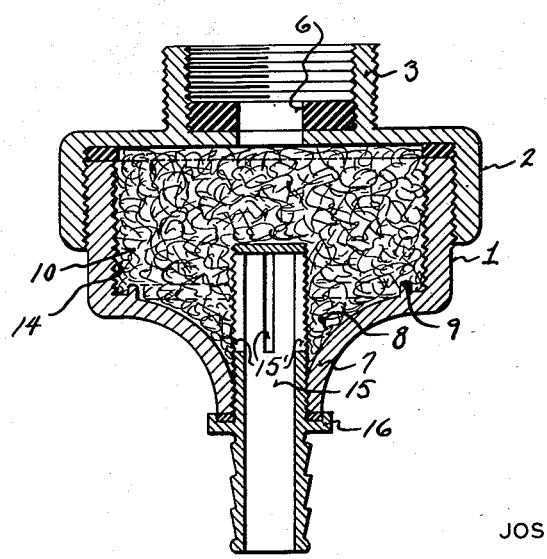

In the drawings:

Fig. 1 represents a sectional elevation of a faucet filter embodying the features of my invention; and Fig. 2 is a similar sectional elevation of the filter casing equipped with a sieve nozzle, extending upwardly into the filter material, whereby the said casing, so equipped, may be utilized for commercial purposes.

Referring by characters to the drawings, 1 indicates a casing exteriorly threaded for the reception of a cap 2, which cap has extending upwardly therefrom an exteriorly and interiorly threaded nipple 3, which nipple may be for direct connection to a threaded socket, as shown in Fig. 2, or said nipple may be fitted with a collar 4 in threaded union with its exterior surface. This collar is provided with a plurality of pointed screws 5, adapted to engage the smooth end of a faucet.

When the filter is so equipped, the nipple is filled with a series of yieldable packing rings 6, whereby a tight joint is effected with relation to the faucet.

The bottom of the casing is formed with a restricted discharge mouth 7, internally threaded, the same forming a well 8, which well is flared outwardly and terminates with a bottom bead 9, adapted to engage the filter material 10.

The bottom of the filter material is supported by a fine screen disc 11, and a coarse filter disc 11', the said discs being fitted to a downwardly bowed spacing filter disc 12, all of which discs rest upon the shoulder of the casing bottom.

The bowed filtered disc forms, in conjunction with the fine and coarse filtered discs, a pocket for the reception of a volume of water, whereby said volume is discharged through the disc 12 for use.

The top face of the filter material has loosely fitted thereon, a coarse filter screen 13, which filter screen is spaced from the inner upper wall of the cap.

In assembling the filter material, which is packed snugly in the casing, it will be observed that when it is desired to remove the dirt clogged filter material, which is in cake form due to the fact that its outer wall engages the internal threads 14 of the casing, all that is necessary is to simply twist the cake, whereby it can readily be removed as it will travel outwardly after the same is unwound from its casing thread engagement.

As shown in Fig. 2 of the drawings, the filter is assembled for commercial purposes, and the nipple which is provided with a single packing ring, may be attached to an exteriorly threaded faucet end, or in some instances it may be attached to a hose coupling.

In this modification of my filter, I provide an exteriorly threaded nozzle 15, having longitudinal slits 15' at its upper end, which slits serve as a sieve through which the filtered water travels.

In this particular type of filter, the filter pulp is packed into the casing above and about the threaded upper end of the nozzle.

Intermediate of its ends, the nozzle is provided with a flange 16, which engages the restricted mouth of the casing, and a suitable packing ring to prevent leakage.

From the flange 16, the nozzle projects downwardly and is exteriorly corrugated for the reception of a hose pipe, whereby the said flexible hose connection is utilized for filling bottles of the like.

From the foregoing description, it will be apparent that when the filter material becomes clogged with foreign matter and it is necessary to remove the same, it will be twisted upon the internal threads of the casing and also the exterior thread of the upper nozzle end, which action will cause the cake to be readily removed from the casing, and this provision of my invention is important.

I claim:

A faucet filter comprising a casing, an upper cap in threaded union with the outer face of the casing, said cap having a centrally defined inlet communicating with the interior of said casing, an upright annular collar carried by said cap, a plurality of pointed screws threaded through said collar adjacent the upper periphery thereof, an upright annular shouldered bead at the bottom of said casing, said casing being provided with a restricted discharge mouth, a coarse screen disc seated in the shouldered bead, a fine screen disc seated upon said coarse screen, an upper screen disc spaced from the pair of discs having filtered material packed between said upper disc and the lower set of discs, and a downwardly bowed filtered disc seated in the shouldered bead below the associated fine and coarse screen discs to form a water pocket between the group of discs, whereby the water is discharged from the pocket through the casing mouth.

JOSEPH F. AUBERSCHEK.

REFERENCES CITED

The following references are of record in the file of this patent:

UNITED STATES PATENTS

| Number | Name | Date |
|---|---|---|
| 673,723 | Thomson | Oct. 25, 1910 |
| 727,374 | Johnston | May 5, 1903 |
| 1,985,411 | Houck | Dec. 25, 1934 |
| 2,368,035 | Moore | Jan. 23, 1945 |

FOREIGN PATENTS

| Number | Country | Date |
|---|---|---|
| 363,173 | Great Britain | Dec. 17, 1931 |
| 799,374 | France | June 16, 1936 |